United States Patent [19]

Michael

[11] Patent Number: 5,751,853
[45] Date of Patent: May 12, 1998

[54] LOCATING SHAPES IN TWO-DIMENSIONAL SPACE CURVES

[75] Inventor: David Michael, Newton, Mass.

[73] Assignee: Cognex Corporation, Natick, Mass.

[21] Appl. No.: 581,955

[22] Filed: Jan. 2, 1996

[51] Int. Cl.[6] .................................................... G06K 7/48
[52] U.S. Cl. ........................................................ 382/203
[58] Field of Search ................................. 382/173, 177, 382/179, 199, 203

[56] References Cited

U.S. PATENT DOCUMENTS

| | | | |
|---|---|---|---|
| 4,183,013 | 1/1980 | Agrawala et al. | 382/203 |
| 4,712,248 | 12/1987 | Hongo | 382/203 |
| 4,731,858 | 3/1988 | Grasmueller et al. | 382/199 |
| 4,910,786 | 3/1990 | Eichel | 382/199 |

*Primary Examiner*—Jose L. Couso
*Attorney, Agent, or Firm*—Russ Weinzimmer

[57] ABSTRACT

A method is provided for finding a feature of an object by finding at least one instance of a model two-dimensional space curve that represents the feature within a target two-dimensional space curve that represents at least a portion of the object. Unlike previous methods for finding a two-dimensional space curve within another two-dimensional space curve, the method of the invention is able to find any shape at any orientation or position in the two-dimensional space curve. The model and target two-dimensional space curves each include a plurality of points. Each point is characterized by a position in two dimensions, where the position is a function of distance S along the two-dimensional space curve. For each of the plurality of points of the two-dimensional space curve, the position in two dimensions as a function of distance S is converted into an angle as a function of distance S to provide an angle-based space curve. Then, at run-time, the angle-based model space curve is used to find at least one position along the angle-based target space curve that results in a match metric value that exceeds a match threshold. To provide invariance with respect to rotation, translation, and scaling, it is preferred to use normalized correlation as the match metric. The method of the invention can be used to find the notch or flat on the perimeter of a semiconductor wafer.

17 Claims, 4 Drawing Sheets

AT TRAIN - TIME:

AT RUN - TIME:

AT TRAIN - TIME:

AT RUN-TIME:

LOCATING SHAPES IN TWO-DIMENSIONAL SPACE CURVES

FIELD OF THE INVENTION

This invention relates generally to computer vision, and relates particularly to image analysis of two-dimensional space curves.

BACKGROUND OF THE INVENTION

In computer vision, images are sometimes obtained that contain two-dimensional space curves. For example, when an image of an object is analyzed using an edge detector, the boundary of the object can be represented by a series of linked edge points that together form a two-dimensional space curve. The object can be, for example, a semiconductor wafer.

Other ways to produce a space curve given an image of an object include using a boundary tracker based on a setable threshold, such as the method disclosed in co-pending patent application Ser. No. 08/458,908, filed Jun. 2, 1995, or a boundary tracker that follows the "peak" of an edge, such as the method disclosed in copending patent application Ser. No. 08/867,946, filed Dec. 6, 1995, both assigned to Cognex Corporation.

A space curve can also be generated by a position sensor that detects a stream of two-dimensional space points and produces a time-parameterized signal. For example, the curve could represent the two-dimensional position over time of a truck on a road. In this case, a particular sub-curve to be detected might be a particular traffic pattern. Alternatively, if a thermometer or seismograph is used as the sensor, the curve can represent the temperature at a location as a function of time, or the excursion of a seismograph's indicator as a function of time, respectively.

In a space curve that represents the boundary of an object, a particular shape in that space curve may correspond to a feature of the object. For example, a concave angular curve segment (two legs of a triangle) found in the boundary of a semiconductor wafer may represent the notch that is typically found in the perimeter of a semiconductor wafer.

It is sometimes desirable to find one or more instances of a particular curve segment in a larger two-dimensional space curve. There are many approaches to finding two-dimensional shapes in two-dimensional images, but there are no known general techniques for finding rotation-invariant and translation-invariant curve segments of arbitrary shape in two-dimensional space curves.

Presently, applicant is aware of a method for finding only rectangular curve segments within a larger two-dimensional space curve. For example, if the curve segment is a rectangle made up of straight lines, each straight line will be characterized by one of four different angles. In this case, an angle histogram is used to find the angular position of the rectangular curve segment, and consequently find the angular orientation of an object having the rectangular curve segment as a boundary. This technique is described in co-pending patent application Ser. No. 08/330,223, filed Oct. 26, 1994, assigned to Cognex Corporation, which is a continuation of application Ser. No. 07/979,848, filed Nov. 23, 1992, now abandoned.

If there were a general technique for finding space curve segments of arbitrary shape in a two-dimensional space curve, where the space curve represents the boundary of an object, it would be possible to find the position and/or orientation of a feature of an object by finding the particular segment of the space curve that corresponds to the feature. For example, if the space curve segment that represents the notch of a semiconductor wafer (two legs of a triangle) could be found in the boundary of the image of a semiconductor wafer, the angular orientation of the notch, and therefore the angular orientation of the wafer, could be found.

PROBLEMS TO BE SOLVED BY THE INVENTION

It is a goal of the invention to provide a method and apparatus for finding instances of a shape in a space curve.

It is a further goal of the invention to provide a method and apparatus for finding a two-dimensional space curve of any shape within another larger two-dimensional space curve.

It is a further goal of the present invention to provide a method and apparatus that can find a model two-dimensional space curve within another larger target two-dimensional space curve, regardless of the orientation, translation, or scaling of the model two-dimensional space curve.

It is another goal of the invention to provide a method and apparatus for finding instances of a shape in a space curve that is not restricted to finding rectangular-shaped space curves.

It is a further goal of the invention to provide a method and apparatus for finding instances of a shape of a model space curve in a larger target space curve that exploits the entire model space curve to be located.

It is an additional goal of the invention to provide a method and apparatus for finding instances of a shape of a model space curve in a target space curve that does not require feature detection to be performed on the model space curve to be located.

SUMMARY OF THE INVENTION

A method and apparatus is provided for finding a feature of an object by finding at least one instance of a model two-dimensional space curve that represents the feature within a target two-dimensional space curve that represents at least a portion of the object. The method includes the steps of, at train-time, acquiring the model two-dimensional space curve, where the model two-dimensional space curve includes a plurality of points. Each point is characterized by a position in two dimensions, where the position is a function of distance S along the model two-dimensional space curve. Then, for each of the plurality of points of the model two-dimensional space curve, the position in two dimensions as a function of distance S is converted into an angle as a function of distance S to provide an angle-based model space curve.

Then, at run-time, the target two-dimensional space curve is acquired. The target two-dimensional space curve includes a plurality of points, each point being characterized by a position in two dimensions, where the position is a function of distance S along the target two-dimensional space curve. Next, for each of the plurality of points of the target two-dimensional space curve, the position in two dimensions as a function of distance S is converted into an angle as a function of distance S to provide an angle-based target space curve. Then, the angle-based model space curve is used to find at least one position along the angle-based target space curve that results in a match metric value that exceeds a match threshold.

It is preferred to, after the step of converting the model two-dimensional space curve into the angle-based model space curve, reduce the dynamic range of, and/or remove discontinuities in the angle-based model space curve. It is also preferred to, after the step of converting the target two-dimensional space curve into the angle-based target space curve, reduce the dynamic range of, and/or remove discontinuities in the angle-based target space curve.

To provide invariance with respect to rotation, translation, and scaling in the angle-based space curves, it is preferred to use normalized correlation as the match metric. Alternatively, if rotation invariance is not required for the particular application, a match metric such as sum of absolute differences or correlation can be used.

The method and apparatus of the invention can be used to find the notch or flat on the perimeter of a semiconductor wafer. For example, the model space curve that represents the notch can be synthetically generated based on a mathematical description of the notch or flat. Alternatively, a composite model two-dimensional space curve can be statistically compiled from an ensemble of exemplar two-dimensional space curves.

Both the model space curve and the target space curve can be extracted from images of an object to be analyzed using either edge detection on an image that represents at least a portion of the object, or boundary tracking on an image that represents at least a portion of the object.

The technique for converting the position in two dimensions as a function of distance S into an angle as a function of distance S involves performing a first derivative operation with respect to the distance S upon each dimension of the position in two dimensions as a function of distance S to provide a quotient of first derivatives, the arctangent of which provides the angle at the distance S along the space curve. Advantageously, a change in a first dimension per unit change in S and a change in a second dimension per unit change in S can be used as indices into a look-up table having an array of angle values to provide an angle value at each particular distance S along the space curve.

Unlike previous methods for finding a two-dimensional space curve within another two-dimensional space curve, the method of the invention is able to find any shape at any orientation or position in the two-dimensional space curve. In addition, the method is invariant to scale changes in the angle representation of the two-dimensional space curve. The method of the invention is not restricted to finding rectangular-shaped space curves. The method of the invention exploits the entire space curve to be located, and does not require feature detection within the space curve to be located.

BRIEF DESCRIPTION OF THE DRAWINGS

The invention will be more fully understood from the following detailed description, in conjunction with the accompanying figures, wherein.

DETAILED DESCRIPTION OF THE PREFERRED EMBODIMENTS

The invention provides a method for finding one or more instances of a model two-dimensional space curve of arbitrary shape, rotation, and translation, anywhere in a target two-dimensional space curve.

The method includes a training phase to generate a model two-dimensional space curve, and a run-time phase that uses the model two-dimensional space curve to find its position somewhere along a target two-dimensional space curve. During the training phase, the pattern to be located, in the form of a model two-dimensional space curve, is converted from a two-dimensional space curve, where the two dimensions specify the (X and Y) position of each point disposed at a distance S along the space curve, into a one-dimensional space curve, where the single dimension is the angle of the tangent to the space curve at each point disposed at a distance S along the space curve. In other words, the pattern to be located is converted from a space curve which is expressed as position in a two-dimensional coordinate system as a function of distance S along the space curve, into a space curve which is expressed as an angle as a function of distance S along the space curve.

Any discontinuities in the angle representation of the space curve are removed using properties of geometry and/or by using more than one copy of the model or target space curve, as will be explained below.

At run-time, the space curve to be searched, i.e., the target space curve, is transformed from the two-dimensional position representation to the one-dimensional angle representation, as was the model space curve at train-time. Next, a search is performed for one or more positions S of the model space curve in the angle representation along the target space curve in the angle representation where a match metric attains a value that exceeds a preselected match threshold.

In a preferred embodiment, the match metric is the normalized correlation between the two space curves in the angle representation. Other match metrics can be used, such as correlation or sum of absolute differences, but these metrics will have different properties with respect to rotation, translation, and scaling of the space curves. For example, the sum of absolute differences metric would not behave the same as normalized correlation with respect to rotation invariance.

As a final result, the one or more positions S where the match metric attains a value that exceeds a preselected match threshold are the found locations of the model space curve in the target space curve.

Figure 1:
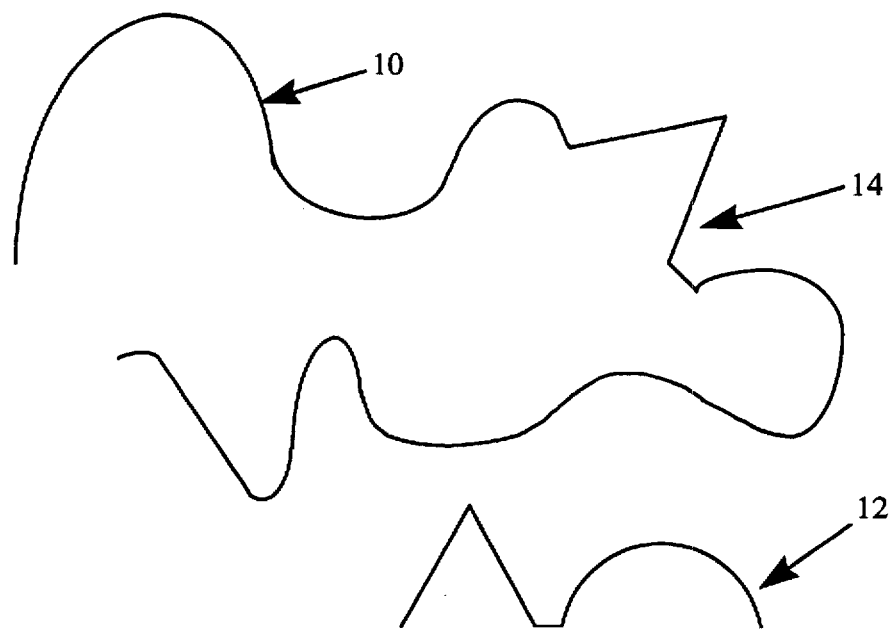
FIG. 1 shows a target space curve and a model space curve that can be found in the target space curve.

We first discuss some properties of two-dimensional space curves. Referring to FIG. 1, a target space curve 10 and a model space curve 12 are shown. The target space curve 10 includes one instance 14 of the model space curve 12, although that instance 14 is rotated about 45° and translated with respect to the model space curve 12, as shown in FIG. 1. Nevertheless, the rotated and translated instance 14 of the model space curve 12 can be found along the target space curve 10 using a particular embodiment of the method of the invention, e.g., the embodiment that employs a normalized correlation match metric, to be discussed below.

Figure 2:
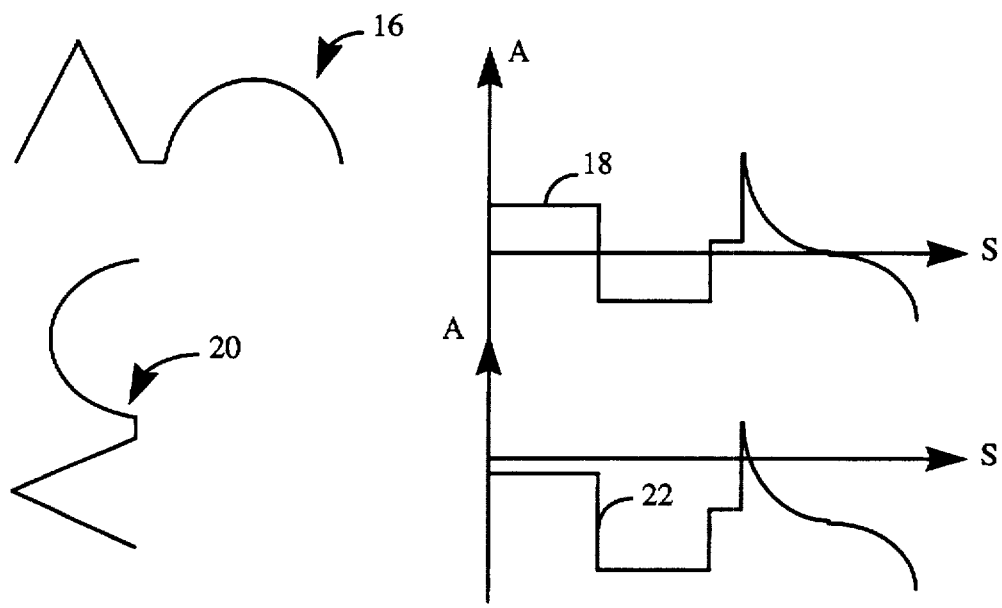
FIG. 2 shows the model space curve of FIG. 1, next to a plot of angle as a function of the distance along the model space curve, as well as a rotated instance of the model space curve of FIG. 1, next to a plot of angle as a function of the distance along the rotated model space curve.

FIG. 2 shows a second instance 16 of the model space curve 12, next to a plot 18 of angle 'A' as a function of the distance 'S' along the curve 16, as well as a third instance 20 of the model space curve 12, next to a plot 22 of angle 'A' as a function of the distance 'S' along the curve 20. Note that the third instance 20 is just the second instance 16 rotated by 90°. Also note that the plot 22 is just the plot 18, but shifted down by a constant value. Thus, rotating a space curve has the effect of shifting along the A axis the plot of angle A versus distance S.

Figure 3:
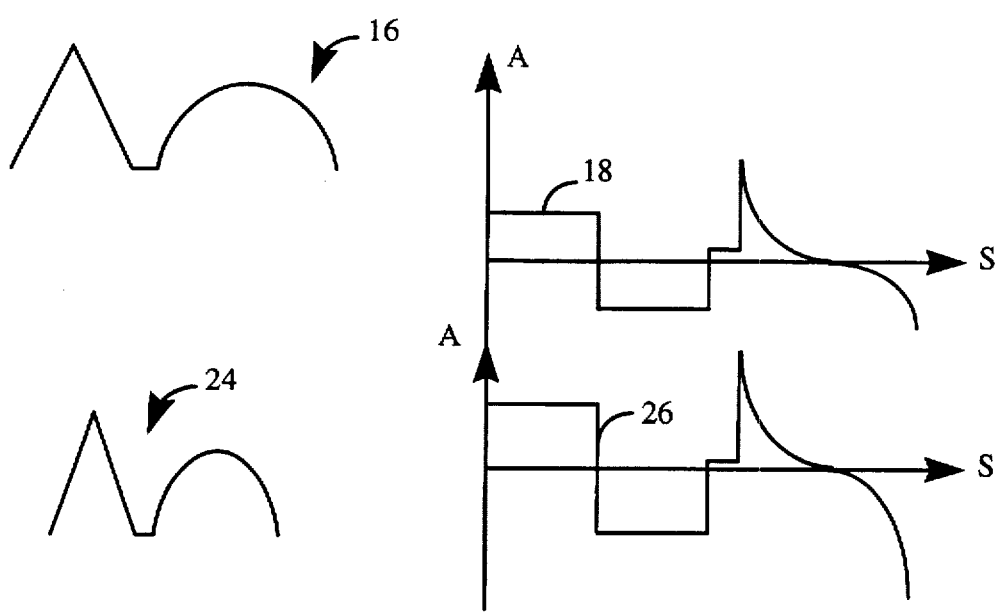
FIG. 3 shows the model space curve of FIG. 1, next to a plot of angle as a function of the distance along the model space curve, as well as a scaled instance of the model space curve of FIG. 1, next to a plot of angle as a function of the distance along the scaled model space curve.

FIG. 3 shows the second instance 16 of the model space curve 12, next to the plot 18 of angle 'A' as a function of the distance 'S' along the curve 16, as well as a fourth instance 24 of the model space curve 12, next to a plot 26 of angle 'A' as a function of the distance 'S' along the curve 20. Note that the fourth instance 24 is just the second instance 16 compressed by about 30%. Also note that the plot 26 is just the plot 18, but expansively scaled by a constant value. Thus, compressing a space curve has the effect of expansively scaling along the A axis the plot of angle A versus distance S.

It should be noted that match metrics with the properties of normalized correlation will find a substantially perfect match between plots 18 and 22, 22 and 26, and 18 and 26. That is because match metrics like normalized correlation are not sensitive to linear transformations such as scaling of a plot, as in the plot 26 with respect to plot 18, and/or adding a constant to a plot, as in the plot 22 with respect to plot 18. This is why, when the method of the invention employs a match metric like normalized correlation, the method is invariant with respect to rotation, translation, and a type of scaling of either the model or the target angle-based space curve.

Figure 4A:
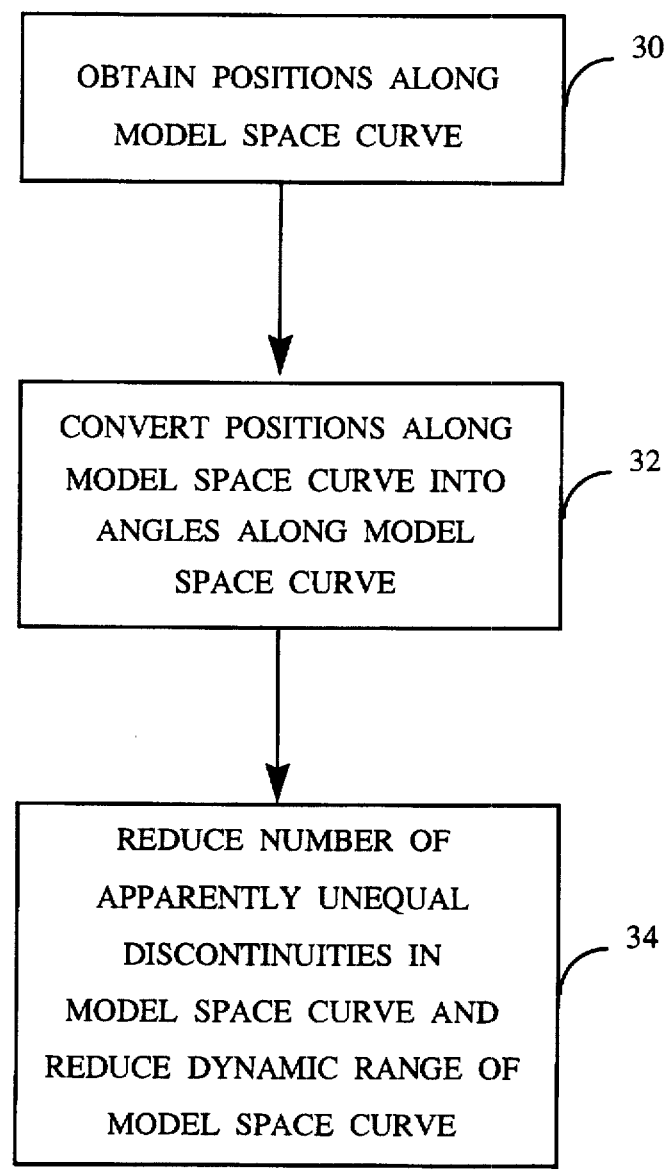
FIG. 4A is a flow chart of the train-time phase of the method of the invention.

Referring to FIG. 4A, in the first step (30) of the training phase of the method of the invention, a two-dimensional model space curve is obtained, where the space curve is described by the two dimensions X(S) and Y(S). Here, X(S) represents the x-coordinate each point on the space curve, Y(S) represents the y-coordinate of each point on the space curve, and S is a parameter that represents a corresponding distance along the space curve for each point on the space curve represented by the X(S), Y(S) coordinate pair.

As explained in the Background section above, using an edge detector to analyze an image of an object can provide the boundary of the object as represented by a series of linked edge points X(S), Y(S) that together form a two-dimensional model space curve. The object can be, for example, the notch of a semiconductor wafer. The edge points can be linked by iteratively testing each edge point as to whether it has exactly one neighbor that is already on the space curve, and then marking it as being on the space curve too. Alternatively, the edge points can be linked by recursively testing all of the neighbors of the last edge point added to the space curve.

Other ways to produce a space curve given an image of an object include using a boundary tracker based on a setable threshold, such as the Cognex Boundary Tracker, disclosed in copending patent application Ser. No. 08/458,908, filed Jun. 2, 1995, or a boundary tracker that follows the "peak" of an edge, such as the method disclosed in copending patent application with Attorney Docket No. C95-043, filed Dec. 6, 1995, both assigned to Cognex Corporation.

An additional way to produce a model space curve is to synthetically generate a model two-dimensional space curve based on a mathematical specification of the space curve X(S), Y(S). For example, if a triangular shape model space curve is desired, the equation for a particular triangle can be used to generate the particular corresponding two-dimensional space curve that is represented by X(S), Y(S).

Yet another way to produce a model space curve is to statistically compile a composite two-dimensional model space curve using an ensemble of exemplar two-dimensional space curves.

Next, the two-dimensional model space curve X(S), Y(S) is converted (32) into a one-dimensional, angle-based space curve A(S). Note that the curve A(S) is still parameterized by the distance S along the curve. To perform the conversion, essentially, the method of the invention finds the angle of a tangent to the space curve X(S), Y(S) at each point S along the space curve, thereby providing the space curve A(S). Thus, first a tangent to the space curve X(S), Y(S) at each point S along the space curve must be computed, and then the angle of the tangent at each point S must be determined. In a preferred embodiment that employs a look-up table, to be discussed below, the steps of finding a tangent and determining its angle can be combined into a single table look-up operation.

To find the tangent to the space curve X(S), Y(S), a quotient of partial first derivatives is computed at each point S along the curve. This is accomplished by taking the partial derivative of X(S) with respect to S at each point S along the curve, and dividing the partial derivative of X(S) with respect to S by the partial derivative of Y(S) with respect to S at each point S along the curve.

To determine the angle of the tangent to the space curve X(S), Y(S) at each point S, the arctangent of the quotient of partial first derivatives as computed above is determined. This is best accomplished using table look-up.

One way to accomplish the steps of finding the tangent to the curve, and the angle of the tangent for a plurality of points along the curve parameterized by S, is to apply the Cognex Angle Finder to the curve. The Cognex Angle Finder examines consecutive points along a space curve, perhaps separated by several points, and finds the angle for that curve segment by table look-up. In the look-up table, the partial derivatives explained above are approximated as first differences, i.e., a first difference in X ("delta X", i.e., the change in X per unit change in S), and a first difference in Y ("delta Y", i.e., the change in Y per unit change in S). Here, delta X and delta Y serve as indices into the look-up table, where for each possible combination of delta X and delta Y, there is a value of the arctangent of the quotient of that particular delta X and delta Y stored at the location indexed by that delta X and delta Y. The value of the arctangent is the angle of the tangent represented by the quotient of delta X and delta Y.

Discontinuities may occur along the space curve A(S) in its angle representation. This can occur anywhere the space curve A(S) changes direction abruptly, such as at a corner. For example, a left-hand turn of 90 degrees would result in a 90 degree discontinuity in the space curve A(S). Furthermore, this discontinuity is essentially identical to a right-hand turn of 270 degrees which would be represented as a −270 degree discontinuity in the space curve A(S). Thus, the two discontinuities appear to be different, when in fact they are equivalent. This can result in failure to find a true instance of the model space curve in the target space curve.

One way to make the discontinuities equal is to add 360 degrees to each negative discontinuity encountered, since this is equivalent to adding 0 degrees. Alternatively, the rule can be to always reduce the largest absolute discontinuity by either adding or subtracting 360 degrees, whichever reduces the absolute magnitude of the largest absolute discontinuity. Thus, in the above example, −270 would be reduced by adding 360 degrees to obtain 90 degrees. Regardless of which rule is applied, the number of apparently unequal discontinuities is reduced (34), and the resulting angle-based space curve is then better suited for use as a model space curve.

When normalized correlation is the match metric used, the dynamic range of the model space curve can be reduced, and angular offset of the model space curve can be adjusted by the following technique. To reduce the dynamic range of the model space curve, the entire angle-based version of the model space curve is multiplied by a constant angle value. Then, to ensure that all the angle values of the angle-based model space curve are positive, another constant angle value is added to the entire angle-based version of the model space curve. The result is a model space curve with a small positive dynamic range. In addition, for some applications, it is advantageous to use the above technique to provide a target space curve with a small positive dynamic range It is possible to adapt the present invention for finding an instance of a model space curve in a target space curve to a multi-scale approach. To accomplish this, a multi-scale version of the model space curve can be generated. The simplest multiscale representation can be generated by low-pass filtering the model space curve, and then sub-sampling it. Each scale of the multi-scale representation has associated with it a model space curve that is about one fourth as long if the sub-sampling and low-pass filtering were one octave in the X and Y dimensions.

Figure 4B:
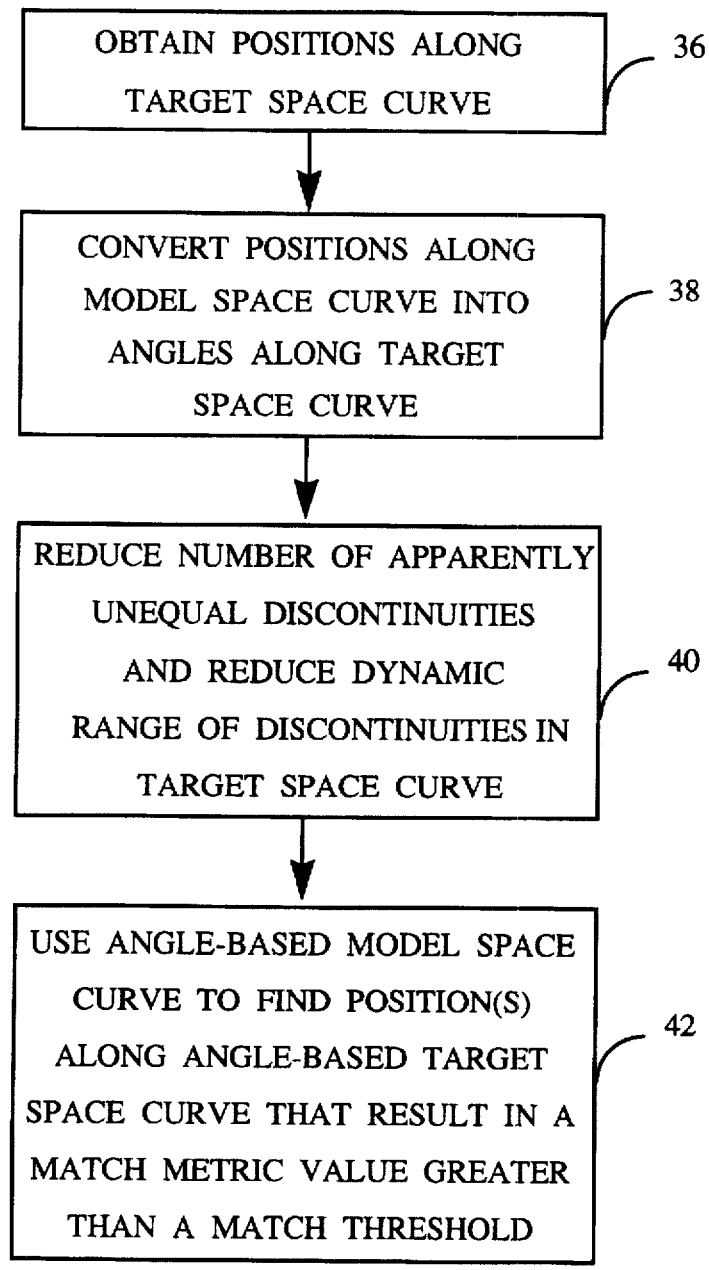
FIG. 4B is a flow chart of the run-time phase of the method of the invention.

Referring to FIG. 4B, in the first step (36) of the run-time phase of the method of the invention, a two-dimensional target space curve is obtained, where the target space curve is described by the two dimensions X(S) and Y(S). The target space curve is the space curve within which one or more instances of the model space curve is sought. Here, as before in the case of the model space curve, X(S) represents the x-coordinate each point on the target space curve, Y(S) represents the y-coordinate of each point on the target space curve, and S is a parameter that represents a corresponding distance along the target space curve for each point on the target space curve represented by the X(S), Y(S) coordinate pair.

As explained in the Background section above, using an edge detector to analyze an image of an object can provide the boundary of the object as represented by a series of linked edge points X(S), Y(S) that together form a two-dimensional target space curve. The object can be, for example, a semiconductor wafer. The edge points can be linked by iteratively testing each edge point as to whether it has exactly one neighbor that is already on the space curve, and then marking it as being on the space curve too. Alternatively, the edge points can be linked by recursively testing all of the neighbors of the last edge point added to the target space curve.

Other ways to produce a target space curve given an image of an object include using a boundary tracker based on a setable threshold, such as the Cognex Boundary Tracker, disclosed in co-pending patent application Ser. No. 08/458,908, filed Jun. 2, 1995, or a boundary tracker that follows the "peak" of an edge, such as the method disclosed in copending patent application with Attorney Docket No. C95-043, filed Dec. 6, 1995, both assigned to Cognex Corporation.

Next, the two-dimensional target space curve X(S), Y(S) is converted (38) into a one-dimensional, angle-based target space curve A(S) using the same method as describe above in step (32).

Just as in the case of the model space curve A(S), discontinuities may occur along the target space curve A(S) in its angle representation, and must somehow be compensated (40). In particular, it is important to attempt to remove discontinuities in places along the space curve where the angle along the target space curve A(S) crosses 0 degrees. If such discontinuities cannot be removed, then multiple versions of the target space curve A(S) must be generated where each version has the discontinuity at a different location. Then, each version of the target space curve A(S), A(S), etc, must be searched with the model space curve.

Creating multiple versions of the target space curve can also advantageously reduce the dynamic range of the angle of the target space curve. Unlike the case of the model space curve A(S), the value of the angle can increase to an extent that can begin to exceed the capacity of fixed point arithmetic hardware and software. For example, if all of the turns of the target space curve are +90 degrees, then the value of the angle will increase with each turn. If −360 degrees is added to the angle at some positions along the target space curve A(S), the dynamic range of the angle value can be limited. Limiting the dynamic range of the angle value in this way can provide greater accuracy when fixed point arithmetic hardware and software are used.

Next, the target space curve A(S) is searched for instances of the model space curve A(S) (42). A match metric is calculated at each candidate position of the model space curve A(S) along the target space curve A(S) to produce a sequence of match metric values. The candidate position(s) resulting in a match metric value that exceeds an empirically determined threshold indicate the existence of one or more instances of the shape of the model space curve in the target space curve. The setting of the threshold depends on the amount of noise in the model space curve and the target space curve, and on the discrimination capability of the model. If no candidate position of the model space curve results in a match metric value that exceeds the threshold, then report that no instance of the model space curve was found.

The exact position of each instance of the shape of the model space curve in the target space curve is best determined using interpolation, such as parabolic interpolation. Alternatively, the position of the greatest match metric value for a particular instance of the model space curve in the target space curve can represent the position of the shape of the model space curve in the target space curve.

The preferred match metric is normalized correlation, although other match metrics can be used, such as sum of absolute differences and correlation. Normalized correlation is preferred when translation invariance, rotation invariance, and scale invariance in the angle-based space curve is desired. Normalized correlation allows angle-based space curves to be matched that are related by a linear transformation, i.e., some combination of scaling and offset. For example, if one angle-based space curve is twice as large as another (scaling), or is shifted up in angle by 100 units (offset), the matching properties of the scaled and/or offset angle-based space curves are unaffected. See FIGS. 2 and 3 to observe how offset and scaling of an angle-based space curve correspond to rotation and scaling of the corresponding position-based space curves.

Normalized correlation can be advantageously accelerated by using the Cognex VC-1/VC-3 integrated circuitry, or using the method for performing fast normalized correlation disclosed in copending patent application Ser. No. 08/203, 812, filed Mar. 1, 1994, assigned to Cognex Corporation.

Using the multi-scale model space curve described above, it may be desirable to use a multi-scale approach to searching for instances of the model space curve in the target space curve.

Other modifications and implementations will occur to those skilled in the art without departing from the spirit and the scope of the invention as claimed. Accordingly, the above description is not intended to limit the invention except as indicated in the following claims.

What is claimed is:

1. A method for finding a feature of an object by finding at least one instance of a model two-dimensional space curve that represents the feature within a target two-dimensional space curve in an image that represents at least a portion of the object, the method comprising the steps of:

at train-time:

acquiring said model two-dimensional space curve, said model two-dimensional space curve including a plurality of points, each point being characterized by a position in two dimensions, said position being a function of distance S along said model two-dimensional space curve;

for each of said plurality of points of said model two-dimensional space curve, converting said position in two dimensions as a function of distance S into an angle as a function of distance S to provide an angle-based model space curve; and at run-time:

acquiring said target two-dimensional space curve, said target two-dimensional space curve including a plurality of points, each point being characterized by a position in two dimensions, said position being a function of distance S along said target two-dimensional space curve;

for each of said plurality of points of said target two-dimensional space curve, converting said position in two dimensions as a function of distance S into an angle as a function of distance S to provide an angle-based target space curve; and using said angle-based model space curve to find at least one position along said angle-based target space curve that results in a match metric value that exceeds a match threshold.

2. The method of claim 1, further including the step of:

after the step of converting said model two-dimensional space curve into said angle-based model space curve, reducing the dynamic range of said angle-based model space curve.

3. The method of claim 1, further including the step of:

after the step of converting said target two-dimensional space curve into said angle-based target space curve, reducing the dynamic range of said angle-based target space curve.

4. The method of claim 1, wherein said match metric is normalized correlation.

5. The method of claim 1, wherein said match metric is sum of absolute differences.

6. The method of claim 1, wherein said match metric is correlation.

7. The method of claim 1, wherein said object is a semiconductor wafer, and said feature is a notch in the perimeter of said semiconductor wafer.

8. The method of claim 1, wherein the step of acquiring said model two-dimensional space curve includes the step of:

synthetically generating a model two-dimensional space curve.

9. The method of claim 1, wherein the step of acquiring said model two-dimensional space curve includes the step of:

statistically compiling a composite model two-dimensional space curve using an ensemble of exemplar two-dimensional space curves.

10. The method of claim 1, wherein the step of acquiring said model two-dimensional space curve includes the step of:

performing edge detection on an image that represents at least a portion of said object to provide a two-dimensional space curve.

11. The method of claim 1, wherein the step of acquiring said model two-dimensional space curve includes the step of:

performing boundary tracking on an image that represents at least a portion of said object to provide a two-dimensional space curve.

12. The method of claim 1, wherein the step of acquiring said target two-dimensional space curve includes the step of:

performing edge detection on an image that represents at least a portion of said object to provide a two-dimensional space curve.

13. The method of claim 1, wherein the step of acquiring said target two-dimensional space curve includes the step of:

performing boundary tracking on an image that represents at least a portion of said object to provide a two-dimensional space curve.

14. The method of claim 1, wherein each step of converting said position in two dimensions as a function of distance S into an angle as a function of distance S includes the steps of:

performing a first derivative operation with respect to the distance S upon each dimension of said position in two dimensions as a function of distance S to provide a pair of first derivatives;

dividing a first member of said pair by a second member of said pair to provide a quotient; and providing the arctangent of said quotient as said angle at said distance S.

15. The method of claim 1, wherein each step of converting said position in two dimensions as a function of distance S into an angle as a function of distance S includes the steps of:

for each pair of points along said two-dimensional space curve, computing a change in a first dimension and a change in a second dimension; and using said change in said first dimension and said change in said second dimension as indices into a look-up table having an array of angle values to provide an angle value that corresponds to said change in said first dimension and said change in said second dimension.

16. The method of claim 2, wherein the step of removing discontinuities includes the step of: adding 360° at a point along said angle-based model space curve.

17. The method of claim 1, further including the step of:

generating a multi-scale representation of said angle-based model and target space curves.

* * * * *